United States Patent
Ashley (10) Patent No.: US 6,344,163 B1
(45) Date of Patent: Feb. 5, 2002

(54) METHOD AND APPARATUS FOR DIPPED FORMING PVC GLOVES AND COT-LIKE ARTICLES

(76) Inventor: Louis S. Ashley, 1149 Hook Rd., P.O. Box 222, Pleasant City, OH (US) 43772

( * ) Notice: Subject to any disclaimer, the term of this patent is extended or adjusted under 35 U.S.C. 154(b) by 0 days.

(21) Appl. No.: 09/064,768

(22) Filed: Apr. 23, 1998

(51) Int. Cl.$^7$ .......................... B29C 41/14; B29C 41/46
(52) U.S. Cl. ...................... 264/310; 425/272; 425/275
(58) Field of Search ..................... 249/79, 87; 264/130, 264/304, 310; 425/104, 269, 270, 272, 274, 275, 276; 427/346, 240, 2.3, 430.1; 118/416, 52, 59

(56) References Cited

U.S. PATENT DOCUMENTS

| | | | | |
|---|---|---|---|---|
| 1,773,148 A | | 8/1930 | Kurkjian | 425/272 |
| 2,009,629 A | | 7/1935 | Mechlin | 425/272 |
| 2,128,827 A | | 8/1938 | Killian | 425/272 |
| 2,146,293 A | | 2/1939 | Gammiter | 425/272 |
| 2,233,555 A | | 3/1941 | Reisinger | 425/272 |
| 2,482,418 A | | 9/1949 | Jenkins | 425/272 |
| 3,117,341 A | * | 1/1964 | Abildgaard et al. | 425/104 |
| 3,146,873 A | | 9/1964 | Johnson | 425/270 |
| 3,278,991 A | | 10/1966 | Peterneill et al. | 425/270 |
| 3,530,825 A | | 9/1970 | Antohissen | 118/56 |
| 4,259,377 A | * | 3/1981 | Baize | 427/346 |
| 4,267,208 A | * | 5/1981 | Ireland | 427/240 |
| 4,275,864 A | | 6/1981 | Richards | 249/79 |
| 4,406,853 A | * | 9/1983 | Miyata | 264/304 |
| 4,447,468 A | * | 5/1984 | Keable | 427/346 |
| 4,655,280 A | | 4/1987 | Takahashi | 165/47 |
| 4,888,213 A | * | 12/1989 | Hesterberg | 427/346 |
| 4,996,080 A | * | 2/1991 | Daraktchiev | 427/346 |
| 5,128,088 A | * | 7/1992 | Shimomura et al. | 264/304 |
| 5,750,157 A | * | 5/1998 | Grosswald et al. | 425/270 |

* cited by examiner

Primary Examiner—Nam Nguyen
Assistant Examiner—Thu Khanh T. Nguyen (57) ABSTRACT

An apparatus is provided including an endless conveyor and a plurality of elongated mold elements are mounted from the conveyor and project laterally outwardly of the latter. The apparatus defines coating, heating, and cooling stations through which the mold elements are successively moved and the coating station includes structure whereby the outer end portions of the mold elements may be coated with plastisol. The heating station includes structure by which the mold elements, with the plastisol coating thereon, may be exteriorly and interiorly heated to the cure temperature of the plastisol, the cooling station includes structure for externally and internally cooling the mold elements. The apparatus further includes structure by which the mold elements are rotated about their longitudinal axes during movement of the mold elements through the coating, heating and cooling stations, and structure for rapidly spinning the mold element after they have been coated at the coating station and before they pass through the heating station. Structure also is provided for powder coating the mold elements subsequent to movement thereof through the cooling station while additional structure is provided for automatically removing the coating after being powdered.

20 Claims, 7 Drawing Sheets

METHOD AND APPARATUS FOR DIPPED FORMING PVC GLOVES AND COT-LIKE ARTICLES

CROSS-REFERENCE TO RELATED APPLICATIONS

This application discloses subject matter closely related to the subject matter disclosed in my U.S. application Ser. No. 08/768,629, filed Dec. 18, 1996, for THIN FILM COVER AND METHOD OF MAKING SAME now U.S. Pat. No. 5,932,163.

STATEMENT REGARDING FEDERAL SPONSORED RESEARCH OR DEVELOPMENT

Not Applicable.

BACKGROUND OF THE INVENTION

1. Field of the Invention

This invention relates to a thin film glove and cot-like article constructed of PVC and more specifically to an article which is approximately 0.0015 to 0.006 inches in thickness throughout (plus or minus 0.0005 inches) a major portion of its extent. The article comprising an elongated hollow article which is open at one end and closed at its opposite end. The open end may include a rolled portion defining a reinforcement bead about the open end of the article. The invention also includes an apparatus for making these articles as well as the method of manufacture carried out by the apparatus.

2. Description of Related Art

The following prior U.S. Patents disclose articles which are coated through the use of methods which are similar in general construction and which are formed, in some cases, by somewhat similar methods:

| | |
|---|---|
| 1,773,418 | 2,009,629 |
| 2,128,827 | 2,146,293 |
| 2,233,555 | 2,482,418 |
| 3,146,873 | 3,278,991 |
| 3,530,825 | 4,275,864 |
| 4,655,280 | |

U.S. Pat. No. 1,773,148, dated Aug. 19, 1930, to Yervant H. Kurkjian, discloses rotating a core in a rubber solution.

U.S. Pat. No. 2,009,629, dated Jul. 30, 1935, to E. F. Mechlin, discloses dipping an article to be coated and then spinning the coated articles to throw off excess dip material by centrifugal force.

U.S. Pat. No. 2,128,827, dated Aug. 30, 1938, to F. L. Killian, discloses forming rubber goods (finger cots and gloves) by dipping and then rotating and tilting to obtain reasonably constant thickness.

U.S. Pat. No. 2,146,293, dated Feb, 7, 1939, to J. R. Gammiter, discloses forming rubber goods (finger cots) by dip process.

U.S. Pat. No. 2,233,555, dated Mar. 4, 1941, H. Reisinger, discloses forming rubber goods (finger cots) by dip process.

U.S. Pat. No. 2,482,418, dated Sep. 20, 1949, to W. L. Jenkins, discloses using a high-frequency electrostatic field for drying and vulcanizing shaped, hollow rubber goods.

U.S. Pat. No. 3,146,873, dated Sep. 1, 1964, to John R. Johnson, discloses spinning a dipped article after dipping to detear.

U.S. Pat. No. 3,278,991, dated Oct. 18, 1966, W. V. Peterneill et al, discloses a dip conveyor for forming gloves (apparently not providing any means to spin for the purpose of detearing).

U.S. Pat. No. 3,530,825, dated Sep. 29, 1970, to Peter Antonissen, discloses rotating a coated article about each of two axes angularly displaced at least 30° (preferably 90°) relative to each other.

U.S. Pat. No. 4,275,864 dated Jun. 30, 1981, to Les W. Richards, and U.S. Pat. No. 4,655,280, dated Apr. 7, 1987, to Katsuhiko Takahashi, disclose improvements in interior cooling of molds.

However, the articles and methods disclosed by the above-noted patents are not equivalent to the article of the instant invention or the method utilized informing the article.

SUMMARY OF THE INVENTION

The articles of the instant invention include PVC gloves and PVC finger cots and other cot-like articles.

When forming the articles of the instant invention, elongated male molds are carried on an endless conveyor and successively dipped into a vinyl plastisol while the molds are rotated at a slow speed (20–30 RPM) about their longitudinal axes. Thereafter, the molds are removed from the plastisol and rapidly spun (1,000–1,200 RPM) about longitudinal axes thereof to spin off excess plastisol. Then, the molds move through a heating oven or chamber (for generally 45 seconds) while being rotated at slow speed and the exteriors and interiors of the molds are heated by rapid heated air flow and/or infra-red heating in order to rapidly increase the exterior temperature of the molds as well as the plastisol article thereon to approximately 275–400° F. The molds then move from the heating chamber and into a cooling chamber while the molds are being rotated at slow speed and the exteriors and interiors of the molds are subject to rapid flow of cooling air in order to quickly reduce the temperature of the molds and the articles thereon to approximately 120° F. Thereafter, the article molds and articles thereon are moved to the next station at which the open ends of the articles are rolled to form reinforcing beads thereon. Thereafter the artricles are powdered and are removed from the molds and the molds. The molds then continue through the next dipping, spinning, heating and cooling steps.

The importance of forming the articles (gloves and finger cots as well as other finger cot-like articles) of polyvinyl chloride (PVC) includes the utilization of a less expensive product in forming the articles, using a material to form the articles which allows excess material spun from the molds to be collected and returned to the vat of material into which the molds are dipped and using a material which may be "cured" more quickly. In addition, the utilization of PVC as opposed to latex rubber enables greater wall thickness control of the finished articles. The use of PVC in forming the articles of the instant invention by the disclosed method allows wall thickness control of approximately plus or minus 0.0005 inches throughout the entire article. Furthermore, although it is generally necessary to heat the coating and the molds to approximately 370° F., depending upon the compound of the plastisol utilized, fusion temperature or cure may be reached between 275° F. and to 400° F. Still further, it is only necessary for the forms to spend between 15 and 45 seconds in the heating chamber and even less time in the cooling chamber. Also, it is pointed out that the air heating of the exterior of the molds could be augmented by radiant heat energy, infra-red energy, or, as an additional option, infra-red energy alone may be utilized to heat the mold exteriors sufficiently to effect a cure of the article thereon, although this type of heating may not be desirable in some instances. If infra-red heating is utilized, inasmuch as the PVC material, in the thin-wall thickness desired, is relatively transparent, not only the article coating on the mold is heated by infra-red energy, but the mold surfaces inside the coating will be heated by infra-red energy.

Vinyl plastisols are dispersions of special fine particle size polyvinyl chloride resins in plasticizing liquids. In addition to the resins and plasticizers, heat or light stabilizers, color pigments, flame retardants, blowing agents, or many other additives may be included as determined by the intended product. Plastisols are fused with heat in relatively thick section without concern for solvent or water blistering; they are commonly referred to as 100% solids material.

Plastisols are liquid at room temperature. Depending upon the compound, they can be poured pumped or sprayed or cast. As a plastisol is heated, fusion takes place and it is converted in to a tough, homogeneous mass with excellent abrasion, aging, corrosion, and electrical resistance.

Fusion requirements vary from compound to compound. Minimum fusion temperature is the temperature at which the ultimate physical properties are obtained. It is necessary to bring the entire mass of plastisol and adjacent surfaces up to that temperature. The minimum fusion temperature of plastisol usually is 350° F., although lower temperature fusion plastisols are available.

The main object of this invention is to provide a hollow, thin wall PVC article of substantially constant wall thickness utilizing a method of manufacture which substantially eliminates wastage of the material of which the article is formed and allows the article to be formed in considerably less time that which is required to form similar articles of latex rubber. In this manner, the quality of the product is improved, wastage of material of which the article is formed is eliminated, and the time required to form the article is substantially reduced. This enables many times the number of articles to be formed utilizing a generally similar manufacturing method than similiar articles formed of latex rubber.

Another object of this invention is to provide a PVC glove or cot-like article to replace similar articles presently being manufactured of latex rubber and to thereby eliminate allergies to latex rubber encountered by some persons whose jobs now require them to come into close bodily contact with such latex rubber articles.

A final object of this invention to be specifically enumerated herein is to provide a PVC article which will conform to conventional forms of manufacture, be useable in numerous environments, and be resistant to light and abrading as well as being independent of minute particle deterioration and reliable throughout a wide range of usage.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
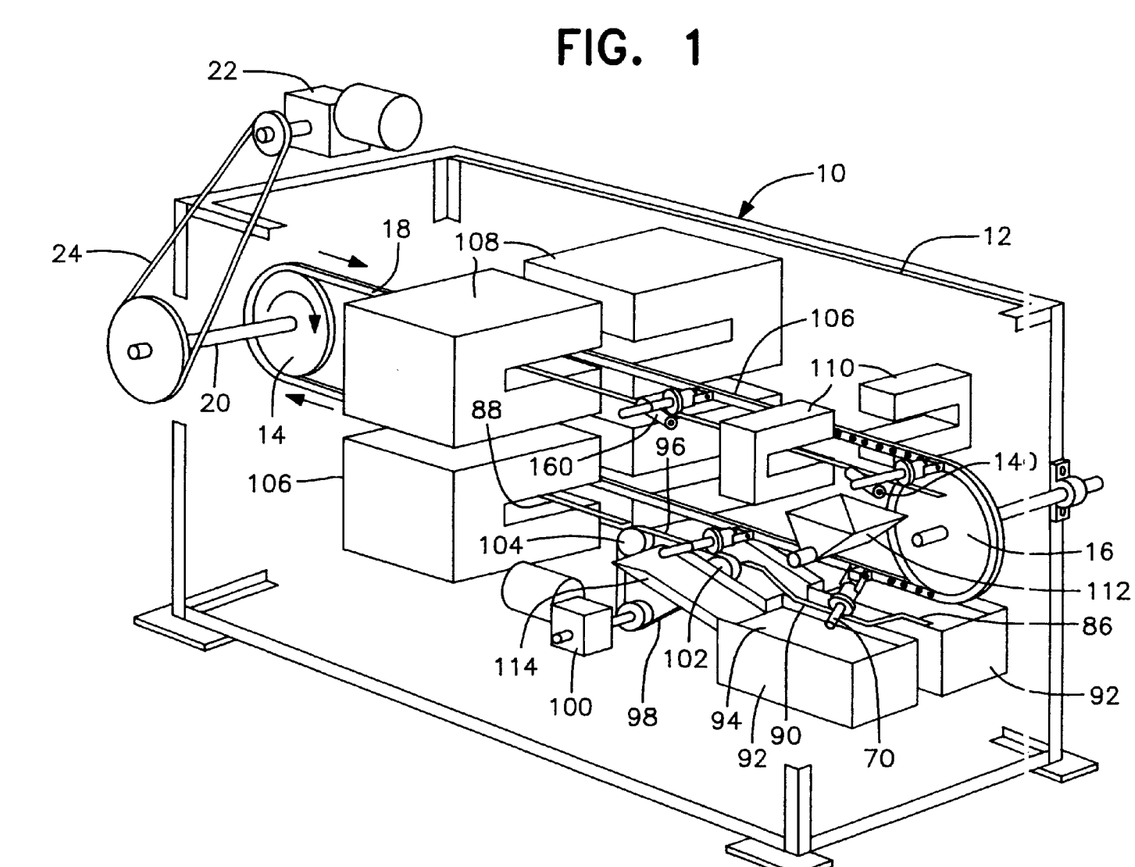
FIG. 1 is a schematic perspective view of an apparatus including a conveyor system, for carrying out the method of the instant invention for producing thin-walled, tubular PVC articles closed at one end.
Figure 2:
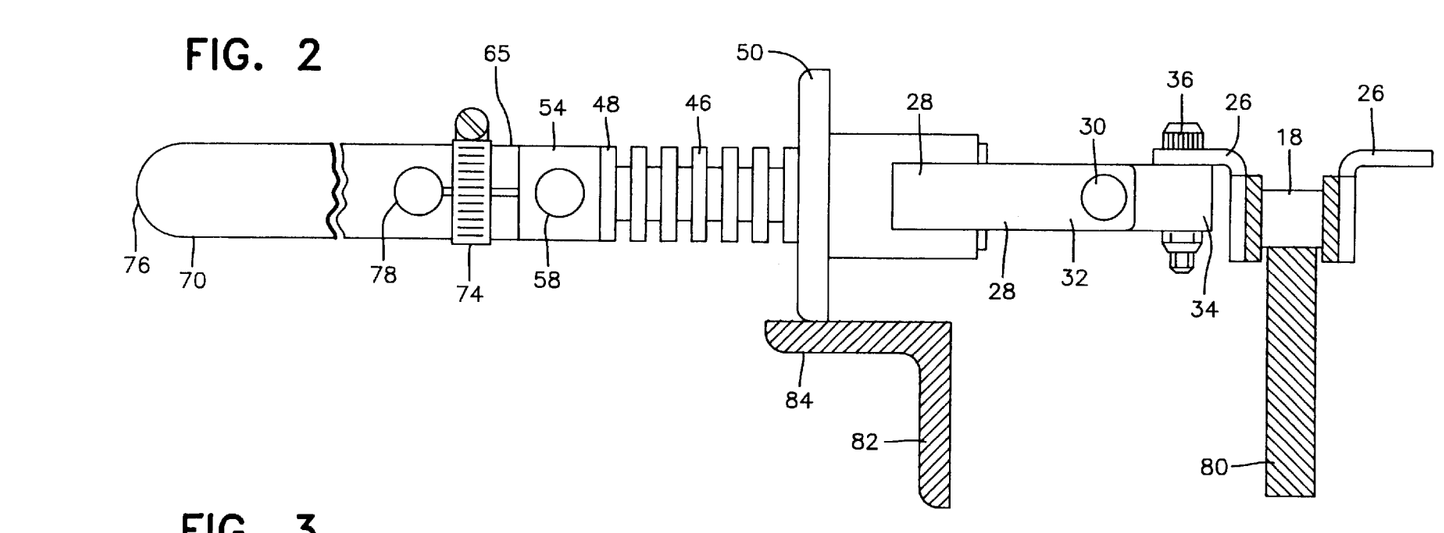
FIG. 2 is an enlarged fragmentary transverse vertical sectional view of a portion of the conveyor system illustrating (in side elevation) one of the pivoting and rotating supports, for a first form of a male mold utilized in the invention, portions of the male mold being broken away.
Figure 3:
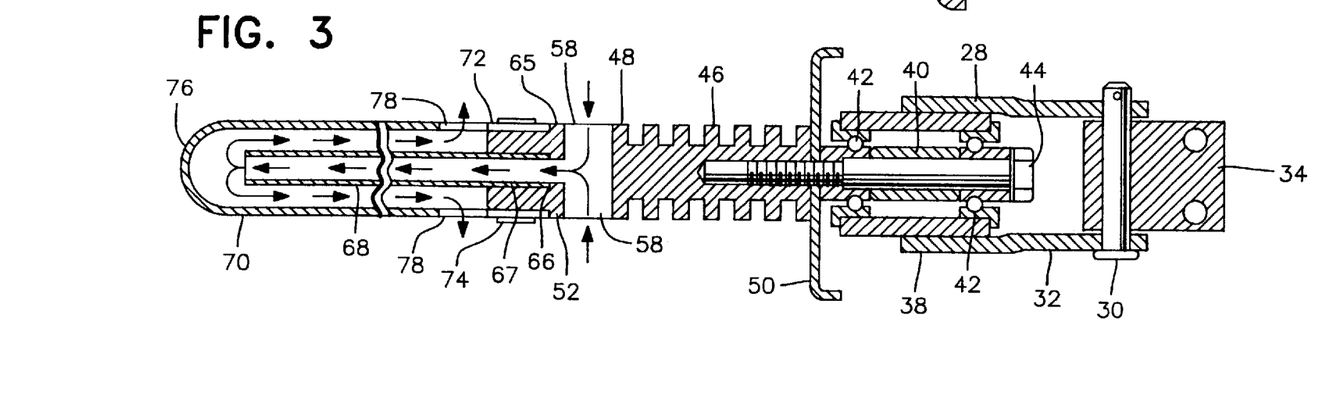
FIG. 3 is a reduced scale horizontal sectional view of the support and male mold structure illustrated in FIG. 2.

Referring now more specifically to the drawings, the numeral 10 generally designates a machine or apparatus by which the articles disclosed hereinafter may be produced. The apparatus 10 includes a framework 12 from which powered and idle sprockets 14 and 16 are journelled. A conveyor chain 18 is trained over the sprockets 14 and 16 and the sprocket 14 is mounted on a power shaft 20 driven by a gear head motor 22 through a drive chain 24. The conveyor chain 18 supports a plurality of mounting brackets 26 at points spaced longitudinally therealong and each of the mounting brackets 26 pivotally mounts a mount arm 28 therefrom for oscillation relative thereto about pivot structure 30 extending transversely of one end 32 of the arm 28 defining a pivot axis paralleling that portion of the chain 18 from which the corresponding mounting bracket 26 is supported, a mount 34 being removably supported from each mounting bracket 26 by fasteners 36 and the one end 32 of the mounting arm 28 being pivotally supported from the corresponding mount 34 by its pivot fastener 30.

The other end 38 of each mounting arm 28 rotatably supports a tubular spindle 40 therefrom through the utilization bearings 42 and a removable fastener 44. The fastener 44 also serves to removably support one end 46 of an elongated male mold 48 as well as a drive disc 50 from the end of the tubular spindle 40 remote from the mount 34.

The other or outer end 52 of the male mold 48 includes diametrically opposite mid-length openings 58 and a outer end central blind bore 66 into which openings 58 open, the bore 66 including a counter bore 67. In addition, the outer end 52 is shouldered at 65. One end of an air inlet tube 68 is secured within the counter bore 67 with the other end of the tube 68 projecting outwardly of the outer end 52.

A test tube-shaped mold element 70 includes a diametrically split open end 72 removably clamped over the exterior of the outer end 52 through the utilization of a hose clamp 74, or the like, and a rounded and closed end 76 loosely enclosing and extending beyond the end of the air inlet tube 68 remote from the shoulder 65. Also, the tubular mold element 70 includes diametrically opposite radial openings 78 opening thereinto immediately adjacent the outer end 52.

The openings 58 and air inlet tube 68 define air inlet passages for admitting air into the end of the male mold 48 adjacent the drive disc 50 and into the closed rounded end 76 of the mold element 70. The interior of the mold element 70 externally of the outer end of the air inlet tube 68 and the openings 78 define an outlet passage for air flow from the interior of the closed end 76 of the mold element 70 to the exterior of the male mold 48 in a manner to be hereinafter described further.

From the foregoing it will be noted that each male mold 48 may be rotated about its longitudinal axis as well as swung about its pivot axis 30.

The upper reach of chain 18 is supported from beneath by a support bar or bracket 80 stationarily mounted from the frame 12 and extending substantially completely between the upper peripheries of the sprockets 14 and 16. Additionally, a similar support bar or bracket (not shown) is stationarily supported from the support frame 12 and underlies the lower reach of the chain 18 and extends substantially the entire distance between the lower peripheries of the sprockets 14 and 16. Further, an upper angle bar 82 is stationarily supported from the frame 12 and extends along the upper support bar 80 in forward spaced relation to the support bar 80. The upper flange 84 of the angle bracket 82 is slightly lower than the upper surface of the support bar 80 along which the upper reach of the chain 18 is slidingly supported and the lower periphery of the drive disc 50 contacts the upper surface of the flange 84 to impart rotary motion to the male mold 48. In addition, first and second lower angle brackets 86 and 88 corresponding to the upper angle bracket 82 are stationarily supported from the frame 12 and generally parallel the lower reach of the chain 18. The angle brackets 86 and 88 are spaced slightly forward, relative to the frame 12, from the lower reach of the chain 18 and are engagable by the drive discs 50 to impart rotary motion (20–30 RPM) to the corresponding male molds 48 as they move along the angle brackets 86 and 88. The angle bracket 86 includes a downwardly depressed central portion 90 centrally intermediate its opposite ends which allows the male molds 48, while being rotated about their longitudinal axes, to swing downwardly at their outer or front ends as they pass in registry with a supply tank 92 of liquid plastisol 94. In addition, between the adjacent ends of the angle brackets 86 and 88 there is disposed the upper reach 96 of a drive belt 98 driven from a gear head motor 100 and trained about idle pulleys 102 and 104, the upper reach 96 being substantially aligned with the adjacent ends of the angle brackets 86 and 88.

A slotted and stationarily mounted heating chamber or oven 106 embraces the downstream end of the lower reach of the chain 18 and a slotted cooling chamber 108 embraces the upstream end of the upper reach of the chain 18.

The chambers 106 and 108 are supported in position such that the horizontally disposed and rotating male molds 48 may pass through the chambers 106 and 108 as male molds 48 move along the downstream and upstream ends of the lower and upper reaches of the chain 18.

Mounted stationarily from the frame 12 adjacent the downstream end of the upper reach of the chain 18 is a slotted powdering chamber 110 through which the male molds 48 may also pass and an article catching trough 112 is also stationarily mounted from the frame 12 immediately adjacent the terminal end of the downstream end of the upper reach of the chain 18 for a purpose to be hereinafter more fully set forth. Still further, an inclined fluid excess material return trough 114 is stationarily mounted from the frame 12 and is inclined downwardly into one end of the supply tank 92 and upwardly toward the chamber 106 along side the upper reach 96 of the drive belt 98.

At this point, it is pointed out that all of the components 26 through 114 described above (other than the upper support bar 80 and the companion non-illustrated lower support bar) are related to the forward facing side of the conveyor comprising the chain 18 and that similar components are provided for the rear side of the conveyor chain 18. Thus, there are (not illustrated) front and rear chambers 106 and 108, front and rear chambers 110, front and rear tanks 92, front and rear drive belts 98, front and rear angle brackets 82, 86 and 88, front and rear troughs 112 and front and rear mounts 34, mounting arms 28, and front and rear mounting molds 48, etc.

Figure 4:
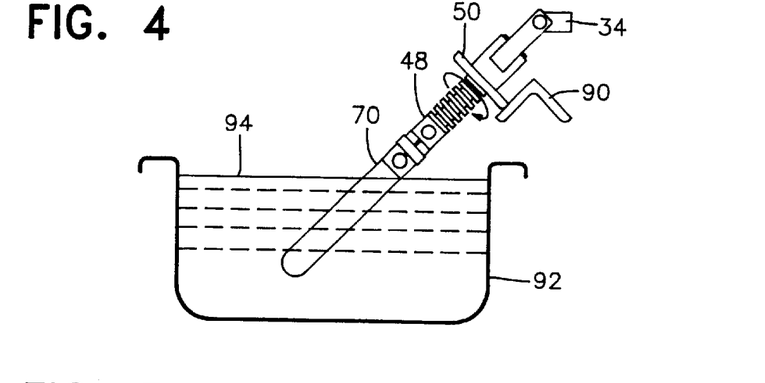
FIG. 4 is schematic view illustrating the manner in which the male mold is tilted down into a tank of liquid plastisol and rotated for coating the exterior of the male mold.

FIG. 4 more clearly illustrates the front supply tank 92 and the liquid plastisol 94 therein as well as the corresponding depressed central portion 90 of the first lower angel bracket 86 and the manner in which a rotating male mold 48 may be swung downwardly to a position with the mold element 70 thereof dipped into the plastisol 94.

Figure 5:
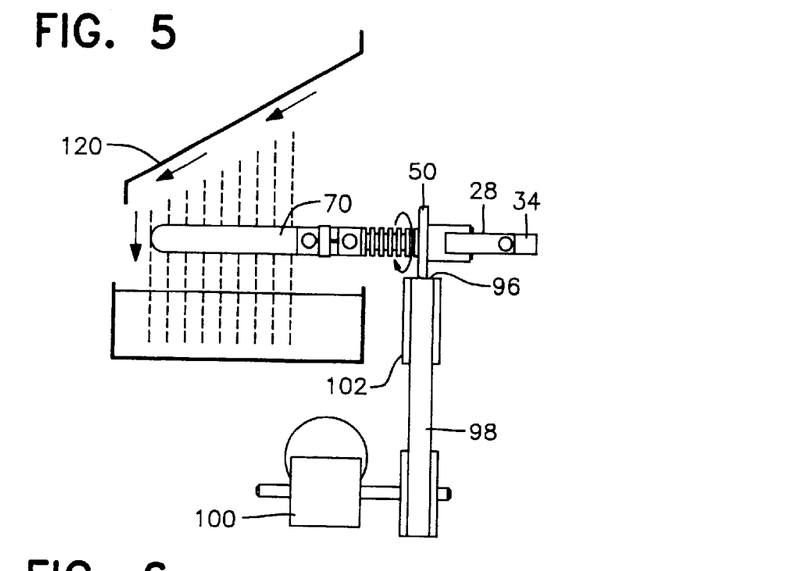
FIG. 5 a schematic view illustrating the manner in which the male mold is rapidly spun for a short period of time after being removed from the liquid plastisol in order to spin excess plastsol from the mold and allow the excess plastisol spun from the mold to be returned to the tank of liquid plastisol.

FIG. 5 clearly illustrates the manner in which the mold element 70 may be rapidly spun (1,000 to 1,200 RPM) over the trough 114 by the upper reach 96 of the drive belt 98 in order to spin off excess plastisol from the mold element 70 after it has been upwardly withdrawn from the tank 92, an upper baffle 120 being mounted above each trough 114 for catching and gravity returning excess plastisol spun upwardly thereon from a rapidly spinning mold element 70 disposed therebeneath, the excess plastisol caught by the baffle 120 being downwardly returned by gravity to the underlying trough 114 and thereafter downwardly along the trough 114 to the corresponding supply tank 92.

Figure 6:
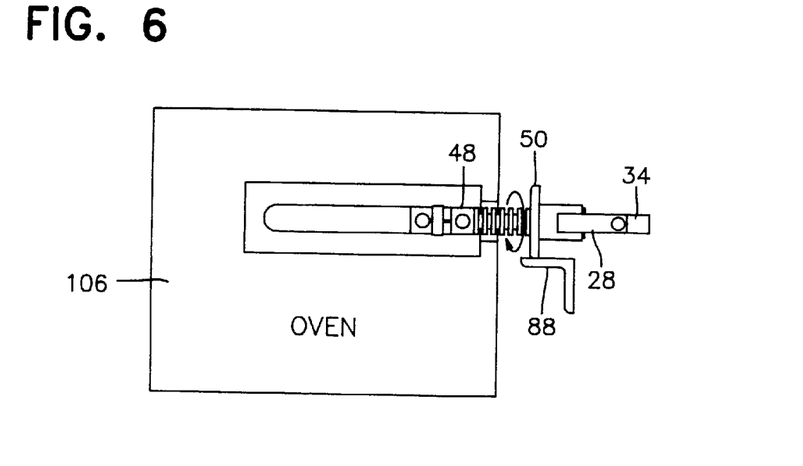
FIG. 6 is schematic view illustrating the manner in which the male mold is passed through a heating oven or chamber while being rotated and heated from both the exterior and the interior of the male mold.
Figure 7:
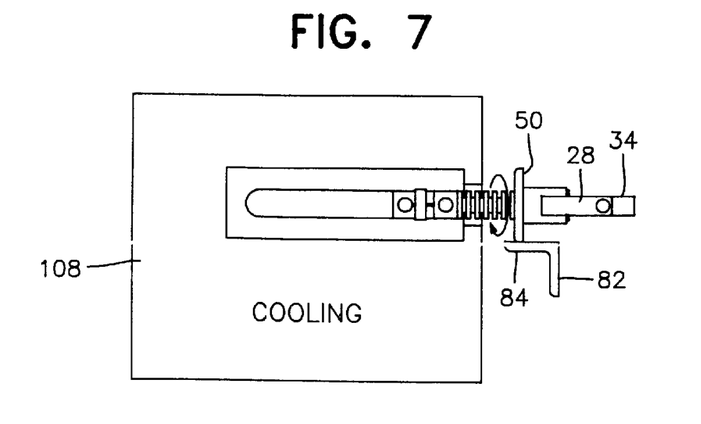
FIG. 7 is a schematic view illustrating the manner in which the male mold is passed through a cooling chamber while being rotated for the purpose of passing rapid currents of cooling are over the exterior of the mold as well as through the interior of the mold.
Figure 8:
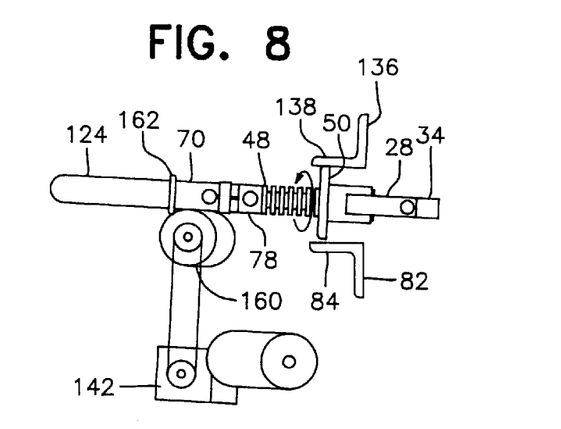
FIG. 8 is a schematic view illustrating the manner in which the formed substantially cooled article has a reinforcing bead rolled on the open end thereof.
Figure 9:
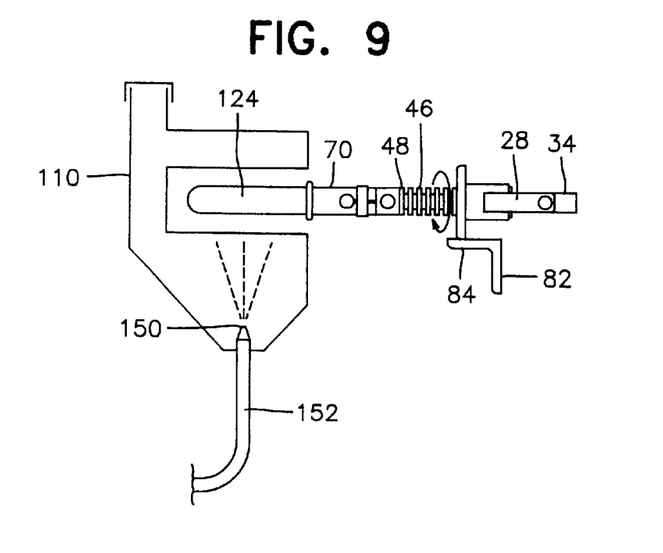
FIG. 9 is a schematic view illustrating the manner in which the article formed on the male mold is further cooled and sprayed with powder prior to removal of the article from the male mold.

FIGS. 6 and 7 illustrate more clearly the manner in which the rotating male molds 48 pass through the heating and cooling chambers 106 and 108. Further, FIG. 9 illustrates the manner in which the mold elements 70 and the articles 124 formed thereon pass through the powdering chamber 110.

Figure 11:
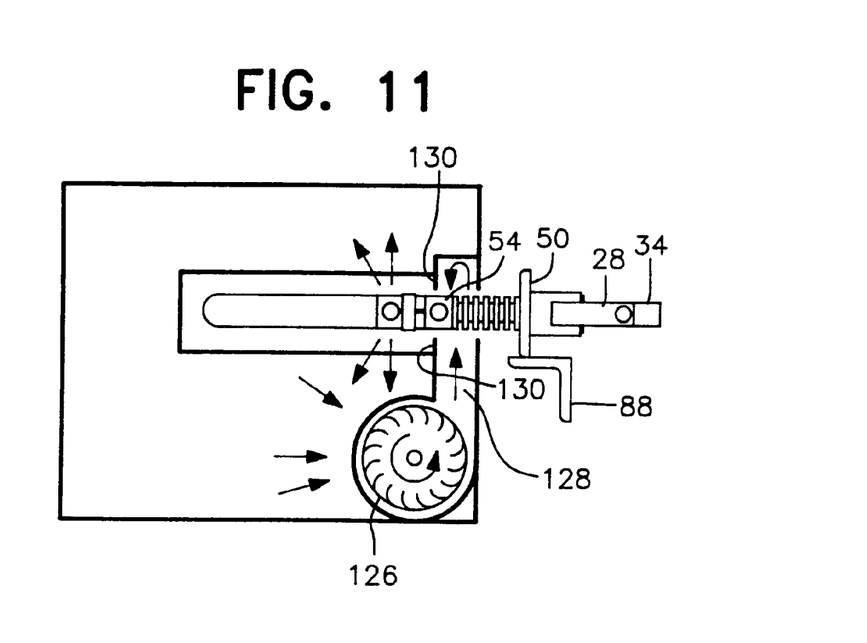
FIG. 11 is a schematic view illustrating, specifically, how heating air as well as cooling air may be caused to flow rapidly over the exterior of the male mold and through the interior of the male mold in both the heating and cooling chambers.

With attention now invited more specifically to FIG. 11, a typical heating chamber 106 (or cooling chamber 108) is schematically illustrated as including a centrifugal fan 126 whose inlet (not shown) opens into the interior of the chamber 106. The fan includes an elongated air outlet plenum 128 which extends along the open end of the corresponding slot of the chamber 106 and includes baffle plates 130 which closely embrace the male mold 48 immediately outward of the fitting 54 thereof. The capacity of the centrifugal fan or blower 126 is sufficient to maintain the pressure of air within the plenum 128 appreciably greater than the pressure of air within the chamber 106outwardly of the plenum 128. Thus, with attention again invited more specifically to FIG. 2, the conditioned air passes into the mold elements 70 through the openings 58 and the air inlet tubes 68 and then passes outwardly from the interiors of the mold elements 70 through the radial openings 78.

The heating of air within the chamber 106 may be carried out by any conventional means such as by electrical resistance heaters, gas or other fuel powered heaters, and even steam pipes, etc. (not shown). In addition to these heating means, or in lieu thereof, infra-red heaters may be placed within the chambers 106. If infra-red heaters and/or electrical resistance heaters are used, not only will the air within the chambers 106 be heated, but the radiant energy exteriorly of the mold elements 70 and directed theretoward will pass through the substantially transparent coating of plastisol on exterior of the mold elements 70 and thus also directly heat the exteriors of the mold elements 70. In any event, the inner and outer surfaces of the mold elements 70 are heated in the chambers 106 as well as the exterior surfaces of the plastisol coating disposed on the mold elements 70. This assures that the cure temperature of the plastisol coatings on the mold elements 70 will be achieved in the shortest time possible.

FIG. 11 also illustrates the manner which cooling air may be rapidly past over the exterior of the mold elements 70 as well as the exterior surfaces of cured plastisol coatings thereon and over the inner surfaces of the mold elements 70 to enable sufficient rapid cooling of the cured plastisol articles prior to removal of thereof from the mold elements 70.

Figure 10:
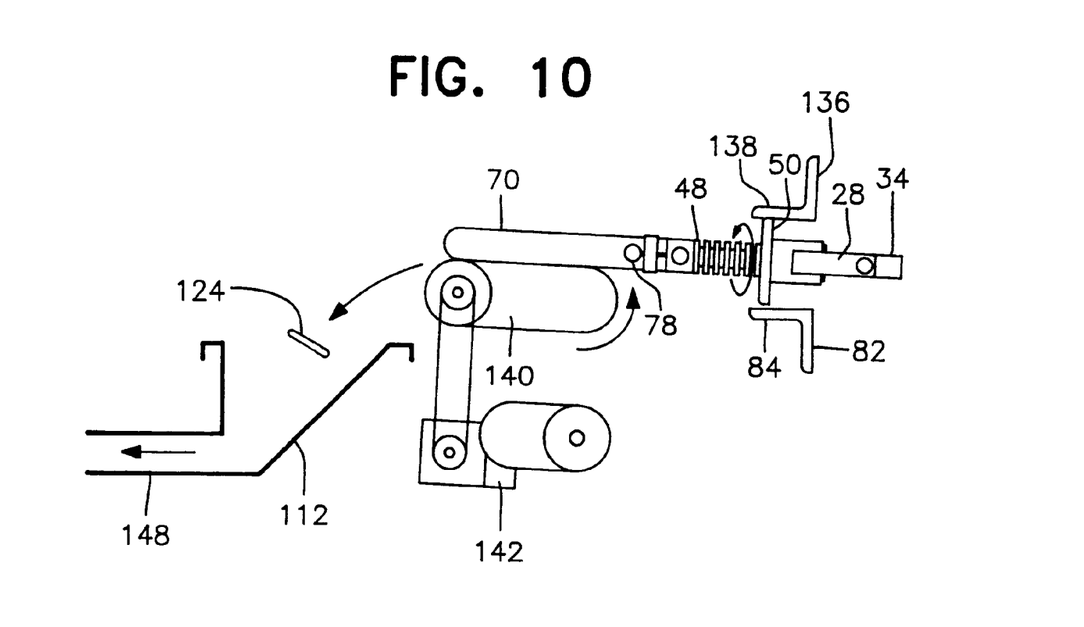
FIG. 10 is a schematic view illustrating the manner in which the powdered article is rolled from the male mold and vacuumed to a collection point.

With attention now invited more specifically to FIG. 10, it will be seen that the generally mid-length and downstream end portions of the upper reach of the chain 18 have an upper angle bracket 136 operatively associated therewith and stationarily supported from the frame 12. The lower horizontal flange 138 of the angle bracket 136 closely overlies the upper flange 84 of the underlying portion of the angle bracket 82 with spacing between the flanges 84 and 138 being slightly greater than the diameter of one of the drive discs 50. An angled friction roller 140 is journalled from the frame 12 and driven adjacent the downstream end of the chain uper reach by a gear head motor 142. The roller 140 is engaged by each mold element 70 and the article 124 disposed thereon, see FIG. 10. As the article covered mold element 70 approaches the friction roller 140, the article 124 engages the friction roller 140 and the outer end of the male mold 48 is slightly upwardly deflected to elevate the corresponding drive disc 50 slightly above the flange 84 and into contact with the overlying flange 138 thereby creating additional frictional contact between the article 124 and the mold element 70. The contact of the friction roller 140 with the article 124 causes the open end of the article 124 adjacent the openings 78 to be rolled along the mold element 70 toward the closed end 76 thereof as the mold element 70 is reversely rotated by the flange 138. Continued contact of the article 124 with the friction roller 140 as the mold element 70 moves along the angled roller 140 ultimately causes the partially rolled open end of the article 124 to be completely rolled off the closed end 76 of the mold element 70, whereupon the rolled article 124, see FIG. 10, falls from the closed end 76 of the mold element 70 and into the article collection trough 112. The article collection trough 112 includes a vacuum outlet pipe 148 opening into the lower end of the trough 112 and leading to a vacuum collection chamber for the articles 124.

It is pointed out that the roller 140 is positioned immediately adjacent the downstream terminal end of the upper reach of the chain 18 downstream from the corresponding powdering chamber 110 through which the articles 124 pass immediately prior to contact with the roller 140 for receiving a coating of powder on the exteriors thereof. The powdering chamber 110 is provided with a compressed air and powder outlet nozzle 150 for upwardly directing powder and additional cooling air onto the exterior of the article 124, the nozzle 150 being supplied air under pressure having powder suspended therein through a supply pipe 152 from any suitable source (not shown) of compressed air and powder. Of course, the jet of air from the nozzle 150 tends to further cool the article.

Also provided on the apparatus 10 adjacent the mid-length portion of the upper reach of the chain 18 is a powered roller 160 similar to, but shorter than the roller 140. The roller 160 is also powered by a gear head motor 142 and engages and slightly upwardly deflects the outer end of the mold element 70 as well as just the open end of the article 124 to roll the open end of the article 124 an amount just sufficient to form a rolled reinforced bead 162 while the article 124 is still sufficiently warm to be "sticky". In this manner, the bead 162 will remain in place as the article 124 is finally cooled by the jet of air directed thereon in the powdering chamber 110. Of course, the mold element 70 is elevated slightly by the roller 160 and thus the disc 50 engages the upper flange to be reversely rotated thereby.

Figure 12:
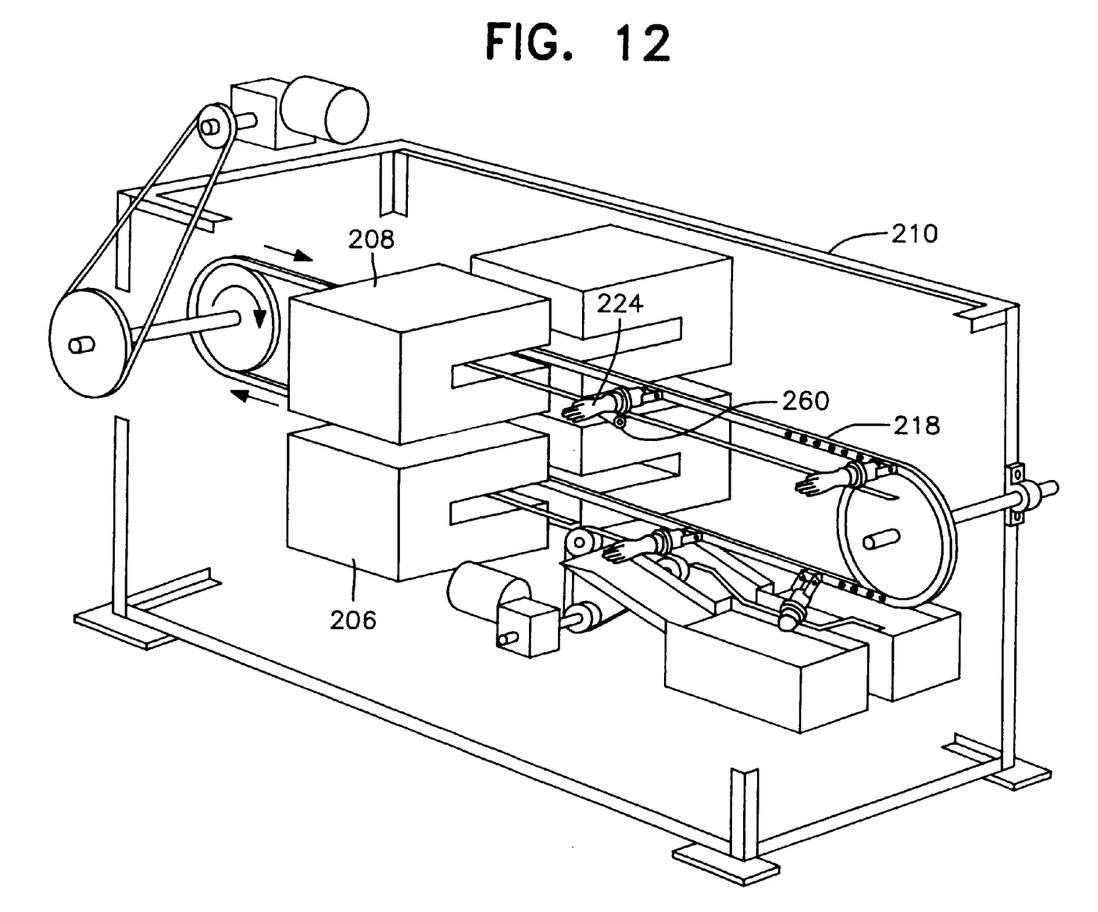
FIG. 12 is a schematic prospective view similar to FIG. 1 illustrating the manner in which a different male mold may be used in the conveyor system in order to form gloves by the method and apparatus of the instant invention.
Figures 13, 14:
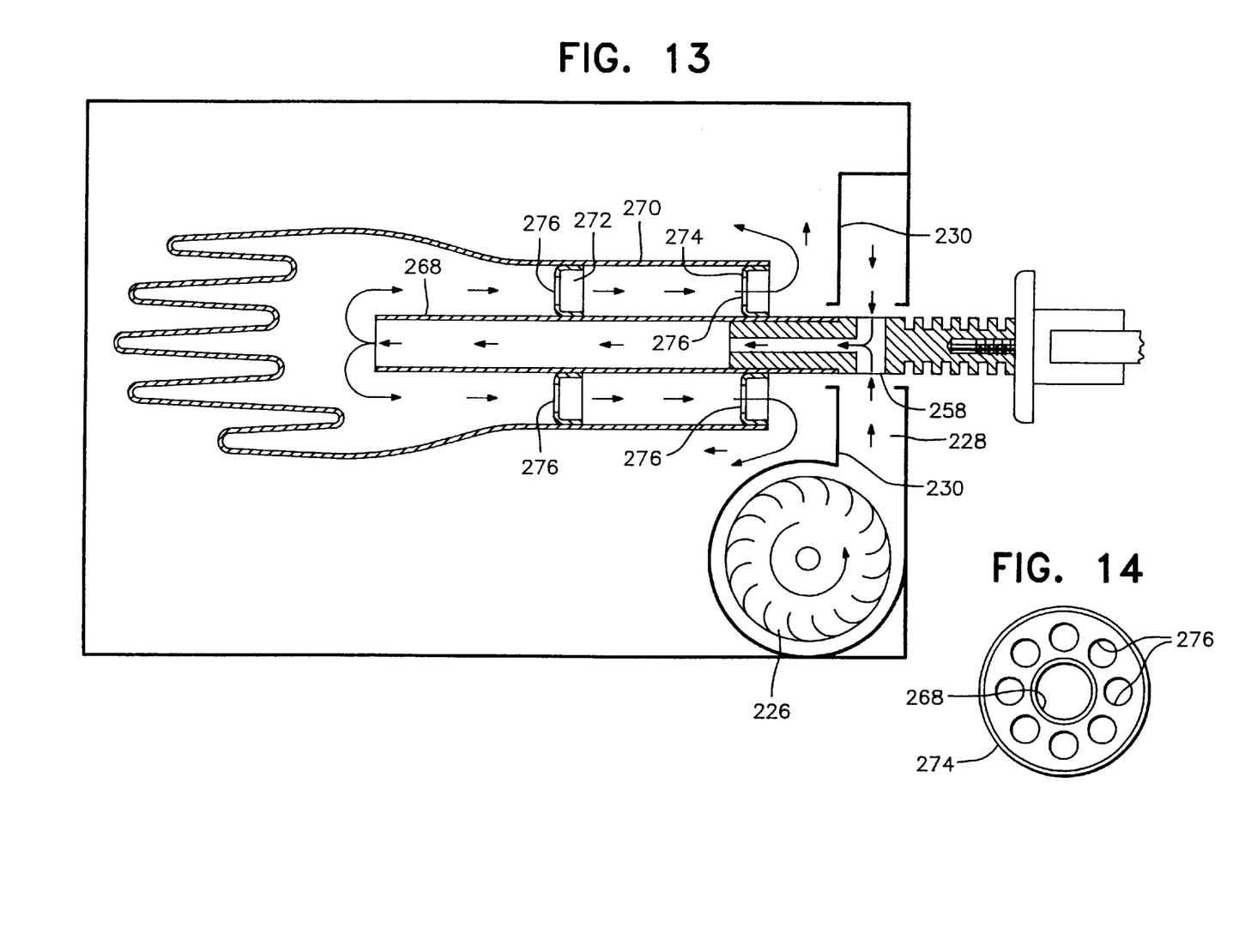
FIG. 13 comprises a schematic view with the male glove mold illustrated in vertical section and illustrating the manner in which both heating and cooling air may be passed through the male mold utilized in the formation of gloves.
FIG. 14 is an end view of the male glove mold illustrating the center inlet passage for heating and cooling air for the glove mold as well as the outer peripheral heating and cooling air exit openings of the male glove mold.

With attention now directed more specifically, to FIGS. 12–14 there may be seen an apparatus 210 corresponding to the apparatus 10 and which is substantially identical to the latter, except that in lieu of the mold elements 70 the apparatus 210 is provided with hollow mold elements 270 for forming gloves thereon. The numeral 206 indicates a heating chamber corresponding to the heating chambers 106. The apparatus 210 also includes cooling chambers similar to the cooling chambers 108, the heating and cooling chambers of the apparatus 210 requiring slightly wider slots at the entrance and exit portions thereof. The mold elements 270 are disposed over air inlet tubes 268 corresponding to the air inlet tubes 68 and longitudinally spaced partitions 272 and 274 support each mold element 270 from the corresponding air inlet tube 268 at points spaced longitudinally therealong, the annular partitions 272 being peripherally apperatured as at 276 to allow the passage heating air and cooling air therethrough.

Accordingly, articles comprising gloves may be formed by utilizing the mold elements 270 in lieu of the mold elements 70. However, the apparatus 210 does not include structure corresponding to the friction rollers 140, the powdering chambers 110 or article catch troughs 112, inasmuch as gloves formed on the mold elements 270 will undoubtedly have to be removed therefrom utilizing at least some manual effort.

With attention again invited to FIG. 12, it may be seen, however, that a shorter powered roller 260 corresponding to the powered roller 160 is provided. The powered roller 260 engages and partially rolls the open end of the article 224 formed on each mold element 270 in order to form a rolled reinforced cuff on each glove element formed.

It is proposed, in addition, that a pressured air jet nozzle may be mounted from the apparatus 210 for movement along the upper reach of the chain 218 as each mold element 270 passes the powered roller 260. Such a pressurized air jet nozzle could be mechanically or mannually moved in unison with each mold element 270 in order to direct a jet of pressurized air onto each mold element 270 immediately adjacent the rolled cuff of the articles 224 disposed thereon as the mold element 270 is being rotated. In this manner, the jet of air discharged onto the mold element 270 at an angle relative thereto would be sufficient to blow under the rolled element cuff of the article 224 as the cuff is being rotated and such air jet would partially inflate the glove article 224 on the mold element 270 and allow the article 224 to be removed from the mold element 270. It is pointed out that the glove article 224 could be turned inside out as it is removed from the mold element 270, inasmuch as the element 224 is made for either a right hand or a left hand and is at least somewhat stretchable, the stretchability of the glove article 224being determined by the plastisol compound being used.

With attention again invited more specifically to FIG. 13, it may be seen that the plenum 228 and baffles 230 corresponding to the plemun 128 and baffles 130 enable air pressure within the plenum 228 adjacent the openings 258 corresponding to the openings 58 to be maintained higher than the air pressure within the chamber 206, corresponding to the chamber 106. Accordingly, rapid air flows from the centrifugal fan 226 inwardly through the air inlet tube 268, about the interior of the mold element 270 and outward of the apperatures 276. In this manner, heated air supplied to the interior of the chamber 206 is caused to rapidly move over the exterior of the mold element 270 as well as rapidly through the interior thereof. Of course, the heating chamber 206 of the appartus 210 also represents the substantially identical strucutre afforded by the cooling chamber 208 of the apparatus 210.

In operation, the mold elements 70 succussively move along the leading end of the angle bracket 86 and then are inclined downwardly into the plastisol 94 within the supply tank 92 in order to coat the mold element 70, outward of the openings 78, with plastisol 94 from the tank 92 as the mold elements 70 are being rotated by engagement of the drive discs 50 with the angle bracket 86. The mold element 70 are allowed to be inclined downwardly into the plastisol 94 by the downwardly depressed central portion 90 of the angle bracket 86. Thereafter, the rotating mold elements 70 are lifted upwardly from the plastisol 94 by the downstream end of the angle bracket 86 and the drive discs 50 are engaged by the upper reach 96 of the drive belt 98 whereby the mold elements 70 are spun rapidly to spin excess plastisol therefrom, the excess plastisol being caught by the baffle 120 and falling by gravity down onto the trough 114, down the latter and back into the supply tank 92. Thereafter, the mold elements 70 move from the drive belt 98 and pass through the slotted heating chamber 106 whereby (while being rotated) the mold elements 70 and articles 124 thereon are rapidly heated to the cure temperature of the plastisol 94.

During final movement along the lower reach of the chain 18 the mold elements 70 are rotated. The angle brackets 86 and 88 may have remote ends (not shown) which curve upwardly half-way about the sprockets 16 and 14 and the opposite ends of the angle brackets 82 may curve half-way downwardly about the sprockets 14 and 16.

As the mold elements 70 move in registry with the cooling chambers 108 they are being rotated by the upper angle bracket 82 and rotation thereof is continued until they engage and are slightly upwardly deflected by the roller 140. Thus, during movement along the upper reach of the chain 18 the mold elements 70 are being continuously rotated as they pass through the cooling chamber 108 and the powdering chamber 110.

As the mold elements 70 contact the powered roller 140 the corresponding drive discs are lifted upwardly slightly out of contact with the upper flange 84 of the angle bracket 82 and engage the horizontal flange 138 of the angle bracket 136, see FIG. 10, in order to oppositely rotate the mold elements 70 as the articles 124 are rolled from the mold element 70.

Operation of the apparatus 210 illustrated in FIGS. 12–14 is substantially identical to the apparatus 10, with the exceptions previously noted as the slight differences of construction of the apparatus 210.

What is claimed as new is as follows:

1. The method of forming an elongated, hollow plastisol article which comprises providing an elongated hollow male mold element having an interior and an exterior and open at one end and closed at the opposite end, longitudinally dipping said mold element from said opposite end into a bath of liquid plastisol while slowly rotating the male mold element about a longitudinal axis thereof in order to form a coating of plastisol on an exterior of the opposite end of the mold element, removing said mold element from said bath, rapidly spinning said mold element about at least one longitudinal axis thereof at a rotational speed sufficient to spin off excess liquid plastisol from said mold element throughout an entire coated area of said mold element, heating the exterior of said coating and the interior of said mold element to at least a fusion temperature of said plastisol, forced air cooling at least the exterior of said coating and mold element and at least the interior of said mold element inwardly of said coating in order to cool said mold element and coating, and then removing said coating from said mold element.

2. The method of claim 1 wherein said mold element is continuously rotated throughout said heating and forced air cooling steps.

3. The method of claim 1 wherein said mold element is rotated about a longitudinal axis thereof during said heating and forced air cooling steps.

4. The method of claim 3, wherein said mold element is rotated about said longitudinal axis thereof throughout the step of removing said mold element from said bath.

5. The method of claim 1, wherein in the step of heating said mold element includes forced air heating the exterior said mold element and the exterior of said coating as well as the interior surfaces of said mold element.

6. The method of claim 1, wherein the step of forced air cooling said mold and coating includes forced air cooling the exterior of said mold element and coating as well as forced air cooling the interior of said mold element.

7. The method of claim 6, wherein in the step of heating said mold element includes air heating the exterior of said mold element and the exterior of said coating as well as the interior of said mold element.

8. The method of claim 1, including powdering the exterior of said coating after said mold element and coating have been forced air cooled.

9. The method of claim 8, including rolling at least the open end of said coating toward the opposite end of said mold element during removal of said coating from said mold element.

10. The method of claim 9, wherein entire length of said coating is rolled toward and off said opposite end of said mold element during the rolling of said coating toward the opposite end of said mold element.

11. An apparatus for forming elongated tubular articles having a first closed end and an open second end, said apparatus including at least one hollow elongated mold element having an interior and an exterior and a closed free end and an open support end, said support end being mounted from said apparatus for successive movement through coating, heating and cooling stations, said apparatus supporting said mold element for slow rotation thereof about a longitudinal axis of said mold element, said apparatus including structure for longitudinally dipping the closed free end of said mold element into a bath of liquid plastisol and subsequently removing said mold element from said bath while said mold element is being rotated, said apparatus including structure for rapidly spinning said mold element after removal from said bath, said apparatus including structure for heating the interior and exterior of a plastisol coating on said mold element as well as the exterior surfaces of said mold element beneath said plastisol coating at said heating station, said apparatus including structure for forced air cooling the exterior of said plastisol coating, the exterior of said mold element and the interior of said mold element at said cooling station.

12. The apparatus of claim 11, wherein said open support end is also mounted from said apparatus for movement through a powdering station subsequent to movement through said cooling station, said powdering station including structure for compressed air discharge of powder onto the exterior surface of said plastisol coating.

13. The apparatus of claim 11, wherein at least one of said heating and cooling stations defines a slotted chamber through which said mold element passes and in which slotted chamber structure is provided for passing temperature conditioned air over the exterior of said plastisol coating and mold element as well as through the interior of said mold element.

14. The apparatus of claim 12, wherein said powdering station is defined by a slotted powdering chamber through which said mold element passes, said powdering chamber including structure for directing pressurized air having powder entrained therein over the exterior of said plastisol coating during movement of said mold element through said mold element through said powdering chamber.

15. The apparatus of claim 13, wherein said apparatus includes an elongated endless conveyor from which said mold element is supported for successive movement through said plastisol coating, heating and cooling stations, said slotted chamber being disposed along one reach of said endless conveyor and opening toward the latter, said elongated mold element projecting outwardly from said one reach toward and movable through said slotted chamber.

16. The apparatus of claim 15, wherein the interior of said slotted chamber is baffled adjacent a lateral open side of the slot defined by said chamber, said mold element including at least one lateral opening formed therein opening into the interior of said mold element adjacent the open supported end of said mold element and also at least one lateral opening formed therein spaced along said mold element from the first mentioned lateral opening toward the closed free end of said mold element, the first mentioned lateral opening passing through the baffled portion of the interior of said slotted chamber and the second mentioned lateral openings passing through said slotted chamber outwardly of the baffled portion thereof, and an air blower in said slotted chamber having an intake opening into said slotted chamber outwardly of the baffled portion of thereof and an outlet opening into said slotted chamber inwardly of the baffled portion thereof.

17. The method of forming an elongated, hollow plastisol article which comprises providing an elongated mold element having first and second ends, supporting said mold element from said first end and longitudinally dipping said second end into a bath of liquid plastisol in order to form a plastisol coating of a predetermined thickness on said mold element, longitudinally removing said mold element from said bath, rapidly spinning said mold element about at least one longitudinal axis thereof at a rapid rotational speed to spin off excess liquid from said mold element throughout the coated area thereof, heating said coating throughout the thickness extent thereof to a the fusion temperature of said plastisol coating, forced air cooling said plastisol coating throughout the thickness extent thereof, forced air cooling of an interior of said mold element, and then removing said plastisol coating from said mold element.

18. The method of claim 17 wherein said mold element is rotated about a longitudinal axis thereof during said heating and forced air cooling steps.

19. The method of claim 17 wherein said mold element is slowly rotated during said dipping and removal of said mold element into and from said bath, respectively.

20. The method of claim 17 wherein said mold element spun at between 1000 and 1200 RPM during the step of rapidly spinning said mold element about said at least one longitudinal axis thereof.

* * * * *